June 2, 1970  D. B. BOWMAN  3,515,275
HEMODIALYSIS METHOD AND EQUIPMENT
Filed March 13, 1968  3 Sheets-Sheet 1

INVENTOR.
DONALD B. BOWMAN, M.D.
BY
ATTORNEYS

June 2, 1970 D. B. BOWMAN 3,515,275
HEMODIALYSIS METHOD AND EQUIPMENT
Filed March 13, 1968 3 Sheets-Sheet 3
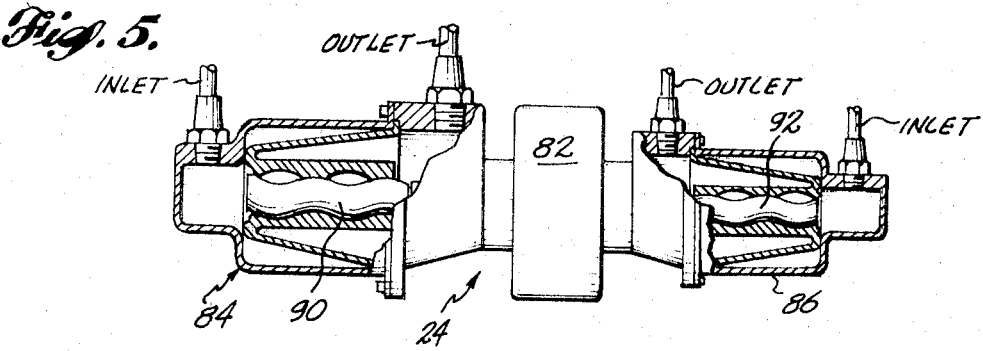
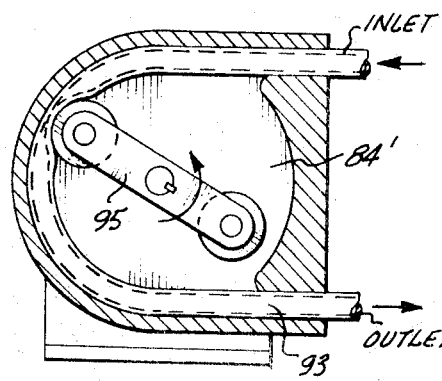 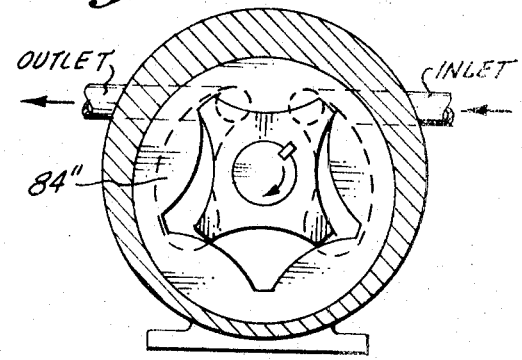
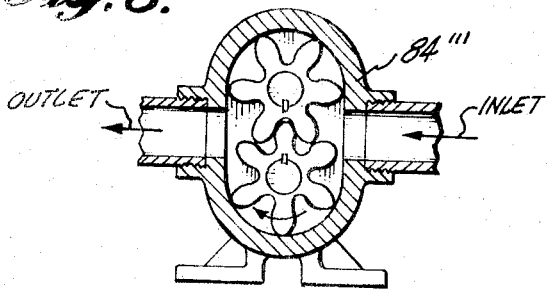 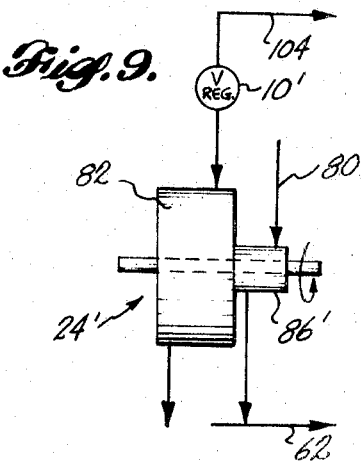
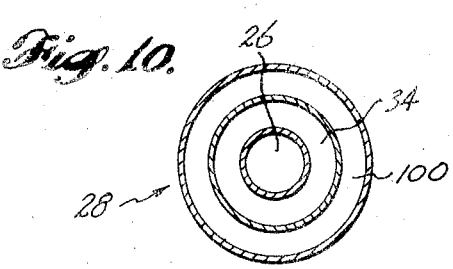
INVENTOR.
DONALD B. BOWMAN, M.D.
BY Graybeal, Cole & Barnard
ATTORNEYS :::{.center}
United States Patent Office 3,515,275
Patented June 2, 1970
:::

3,515,275
HEMODIALYSIS METHOD AND EQUIPMENT
Donald B. Bowman, 1617 Garfield,
Corvallis, Oreg. 97330
Filed Mar. 13, 1968, Ser. No. 712,704
Int. Cl. B01d 13/00
U.S. Cl. 210—22                    17 Claims

ABSTRACT OF THE DISCLOSURE

Flowing tap water powers a rotary proportioner which delivers a metered amount of such water to a flow-through heater in which the water is heated to a temperature at which air and gas in it is bubbled out. The heated water is passed in heat exchange with water incoming to the heater to lower its temperature and preheat the new water. A metered amount of dialysate concentrate from the proportioner is admixed to the heated water. The air and/or gas bubbles are withdrawn and the solution is delivered to a dialyzer. The dialysis equipment is for home use housed within bedroom furniture having a conventional exterior appearance.

BACKGROUND OF THE INVENTION

Field of the invention

The present invention relates to a method and apparatus for preparing a hemodialysis solution, and to hemodialysis equipment which can easily and safely be operated in the patient's home by the patient or members of the patient's family.

Description of the prior art

The essential parts of an artificial kidney system are a dialyzer and apparatus for preparing a dialysis solution. By way of example, a Kiil-type dialyzer comprises passageways formed between two cellophane semipermeable envelopes through which small portions of a patient's blood flows. A dialysis solution or dialysate flows along the outer surfaces of the cellophane envelopes in counterflow relationship to the blood. The dialysis solution removes waste from the blood by a permeation phenomenon. Other types of dialyzers are shown by the following U.S. Pat. Gasca et al. 2,720,879; Metz 2,880,501; Broman 2,969,150; Savino 3,074,559; Ferrari 3,211,645; McKirdy et al. 3,212,498; Kylstra 3,212,642 and Megibow 3,266,269.

The techniques and apparatus now employed for preparing the dialysis solution are complex and require highly trained and skilled personnel for their use. Most known systems are of the "batch" type and require a large storage vessel or reservoir for the prepared solution. Also, re-circulated solution contains bacteria which must be chemically controlled to preheat them from multiplying in the dialysate circuit. These features make such systems unsatisfactory for home use.

Known "single pass" systems are described in "A Physician's Syllabus For The Treatment Of Chronic Unemia," published in 1967 by the Division of Nephrology, Department of Medicine, University of Washington and the Seattle Artificial Kidney Center, Seattle, Wash. This publication is hereby incorporated herein by this expressed reference.

SUMMARY OF THE INVENTION

The present invention primarily relates to a simplified technique and apparatus for preparing a hemodialysis solution and delivering it to a hemodialyzer. It also relates to a concept of integrating the hemodialyzer and the apparatus for preparing the hemodialysis solution into somewhat conventional bedroom furniture so that when used in the home such equipment is not readily identifiable as artificial kidney equipment, and its presence in the bedroom is not readily apparent.

My system for preparing the hemodialysis solution is what may be termed a "single pass," "continuous flow" or "flow through" type system, as opposed to a so called "batch" system in which the solution is prepared and then stored in a relatively large vessel or reservoir. My system utilizes "tap" water, i.e. water from the local water distribution system serving the building in which the apparatus is located. While continuously flowing through the system, from one station to the next, the water is (1) filtered, (2) regulated to a uniform pressure, (3) metered to the proper flow rate, (4) heated to cause degasing, and (5) cooled to the dialysis temperature. A metered amount of dialysate concentrate is then admixed to it and the air and/or gas bubbles formed during degasing are withdrawn. The flow path to the dialyzer is paralleled by a drain fluid flow path. The air and/or gas bubbles and any bypass water are diverted to this second flow path. Also, the system includes safety features including means for detecting an improperly formed solution and diverting it from the primary flow path leading to the dialyzer to the secondary flow path leading to the drain.

A principal feature of the present invention is the provision of a rotary proportioner which is driven by the flowing water. The proportioner has two parts, each of which is a rotary positive displacement device. By way of typical and therefore nonlimitive example, in a system using a dialysate concentrate which must be mixed with the water at a 35:1 ratio, when rotated together at the same rotational speed the positive displacement device for the water will measure and dispense thirty-five units of water for each unit of the dialysate concentrate measured and dispensed by the second device.

Another principal feature of the invention is a flow through type water heating and cooling unit in the nature of an 180° heat exchanger having an electrical heater at the bend. Relatively cold tap water is delivered through cold water passageway means to the heater and is rapidly heated thereby up to a temperature at which air and other gases trapped in the water are bubbled out. The heated water then flows through heated water passageway means which is in a heat exchanging relationship with the said first passageway means. The incoming cold water is preheated at the same time the heated water is cooled down to at least about the temperature it should be at when it enters the dialyzer. The heating and cooling apparatus may also include third passageway means also situated in a heat exchange relationship to the heated water passageway means. According to the invention, additional cooling may be provided by directing water that was bypassed around the proportioner through such third passageway means in a counterflowing heat exchanging relationship to the heated water.

The continuous flow type hemodialysis solution preparation and distribution system of the present invention can be combined with the Kiil type hermodialyzer, or the like, to form an artificial kidney system which occupies a relatively small amount of space, and involves an operational technique which, with only a small amount of education and training, is readily comprehendable by the patient or a member of his family. Thus, equipment of the present invention is particularly suited for in home use in long term treatment of cronic end-stage uremic patients.

A realization by the patient and his family that the patient's life is dependent upon the continued use of an artificial kidney machine is quite depressing to say the least. For the purpose of minimizing depression, which feeling could easily be renewed each time the patient or a member of his family walked into the bedroom and saw the artificial kidney equipment knowing well that the patient's life is dependent upon it, one aspect of the present invention involves incorporating the dialysis preparation apparatus and the dialyzer unit into what appears to be conventional bedroom furniture. Preferably, the dialysis solution preparation apparatus is housed within a small bedside cabinet which in exterior appearance closely resembles a conventional night stand. The dialyzer unit is housed within a hollow headboard portion of a bed which in exterior appearance closely resembles a conventional book case type of headboard.

Another object of the present invention is to provide a relatively inexpensive artificial kidney system, so that more artificial kidneys can be available and more lives can be saved than is now the case. Small hospitals and clinics have a need for an artificial kidney to treat short-term acute kidney failures, but they cannot afford the extremely high price equipment that is now available.

These and other objects, features, advantages and characteristics of my invention will be apparent from the following detailed description of typical embodiments thereof in which reference is made to the accompanying drawing.

BRIEF DESCRIPTION OF THE DRAWING

In the drawing, like reference characters refer to like parts, and:

FIG. 5 is a front elevational view, partially in section, of a rotary proportioning mechanism forming one aspect of the invention;

FIG. 6 is an end view, partially in section, of a modified form of pump;

FIG. 7 is a view like FIG. 6, but of a second modified form of pump;

FIG. 8 is a view like FIGS. 6 and 8, but of a third modified form of pump;

FIG. 9 is a schematic plan view of a rotary proportioner comprising a positive displacement water motor and a positive displacement pump arranged to be directly driven by such motor; and FIG. 10 is a cross-sectional view taken through the heat exchanger portion of the degasser, substantially along line 10—10 of FIG. 3.

DESCRIPTION OF THE PREFERRED EMBODIMENTS

Figure 1:
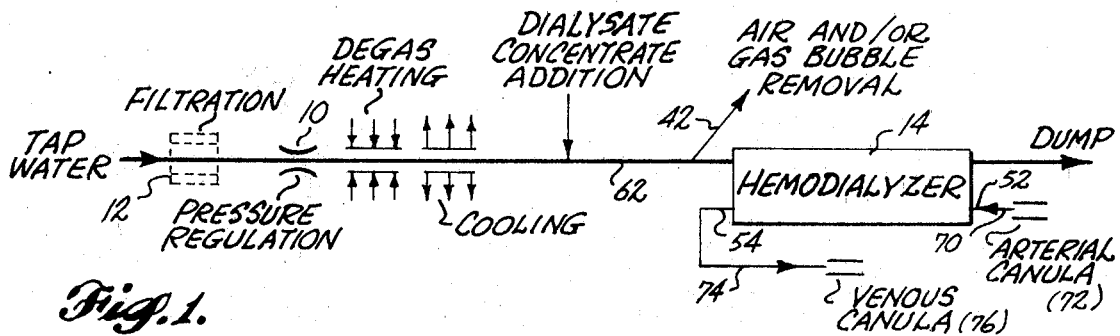
FIG. 1 is a flow diagram of a system of this invention, involving sucessive step treatment of a continuously flowing stream of tap water to form the hemodialysis solution.

Referring more specifically to the several figures of the drawing, and to FIG. 1 in particular, a stream of relatively cold tap water is directed through first a pressure regulator 10 and a flow through type filter 12, but not necessarily in that order. Next it is heated up to a temperature of about 180°–200° F. for the purpose of causing the air and/or gas entrapped in it to form into bubbles. Since this is much too high of a temperature for use in the dialyzer 14, the water must be substantially cooled and the temperature regulated to bring it to the dialysis temperature which is about 100° F., and this is done while the water continues to flow. A dialysate concentrate is admixed to the temperature conditioned water and the air and/or gas bubbles are withdrawn before the fluid reaches the dialyzer 14. In the dialyzer 14 the solution passes along one side of semipermeable membranes in counterflow to the patient's blood which is flowing on the opposite side of the membranes. The cleaned blood is returned to the patient and the spent dialysis solution is dumped.

Figure 3:
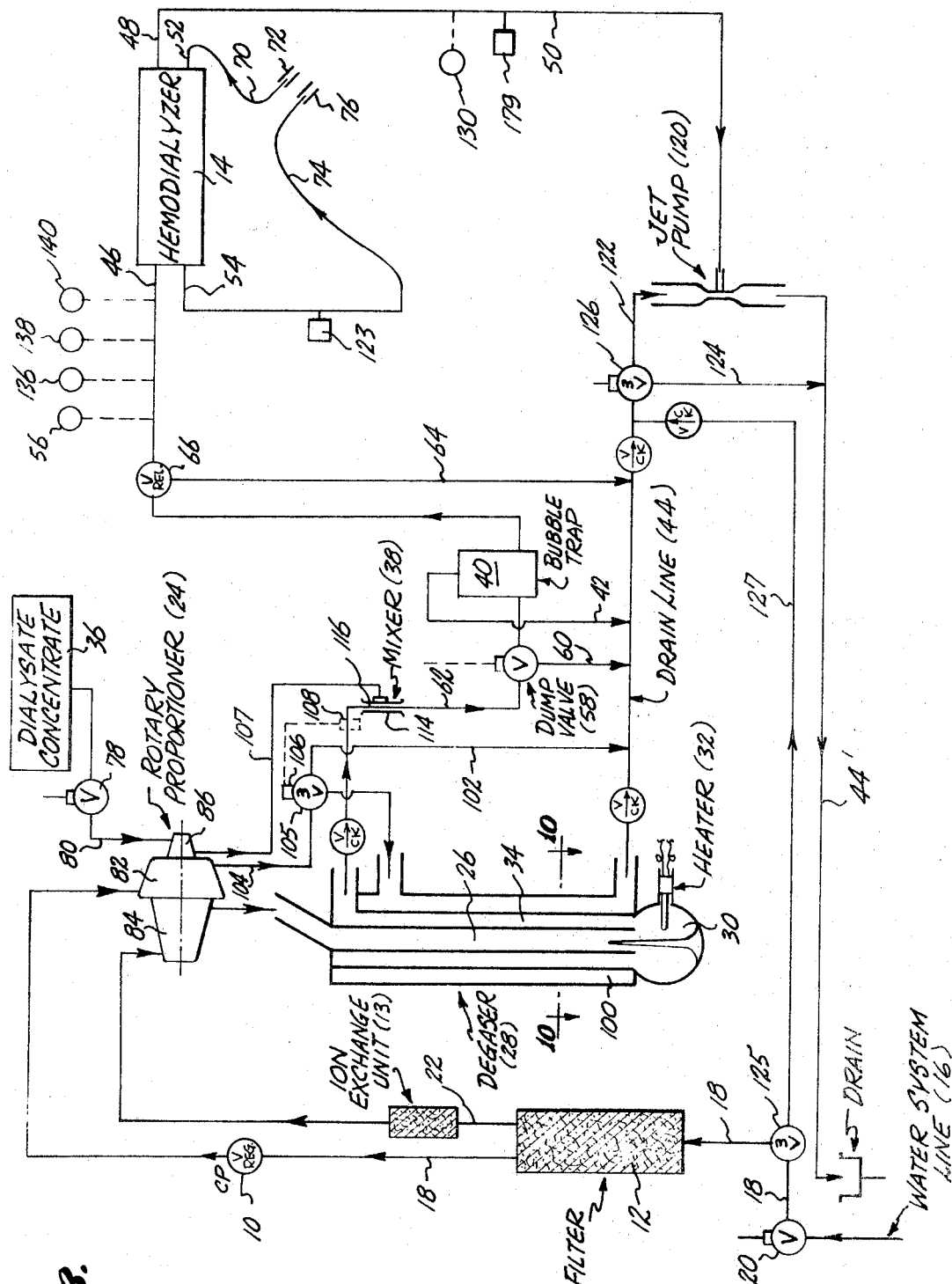
FIG. 3 is a somewhat more detailed flow diagram, including a longitudinal sectional view of a degassing unit forming a part of the invention.

Referring now to FIG. 3, a portion of the local water distribution system (e.g. the water system which delivers water to the homes, buildings, etc. in the locality) is shown at 16. The service line or conduit 18 leading from the water system 16 includes an off-on valve 20. The pressure regulator 10 and the filter 12 are arranged in series in the service conduit 18.

According to the invention, a metered portion of the flow is extracted at 84 by a proportioning device 24, hereinafter to be described, and is directed to the cold-water passageway means 26 of a heat exchanger portion of a degasing unit 28. The cold-water passageway means 26 terminates at a heating zone 30 whereat the water is raised in temperature, such as by an immersion type heater 32, up to about 180°–200° F., to cause the air and/or other gases entrapped in the water to form into bubbles and be available for removal. The direction of flow is reversed in the heating zone 30 and the now heated water is directed through heated water passageway means 34, in a counterflowing indirect heat exchange relationship to the relatively cold water flowing through the cold-water passageways 26. In this fashion the new water oncoming to the heating zone 30 is preheated at the same time the heated water is being cooled down to a level which will make it useable in the dialyzer 14.

Following temperature conditioning of the water, dialysate concentrate from a reservoir 36 is admixed to the still flowing water at 38 to form the hemodialysis solution. The solution is next directed through a gas bubble trap or separator 40 in which the air and/or other gases are withdrawn therefrom, and via branch conduit 42 are discharged into a drain line 44. The solution should then be ready for delivery to the hemodialyzer 14, and if so is introduced into a dialysis solution inlet 46. The spent solution leaves the dialyzer 14 at outlet 48 and flows through a discharge conduit 50 to a drain. The dialyzer 14 also includes a blood inlet 52 and a blood outlet 54.

OPERATION

The patient's arterial canula 72 is connected to the arterial blood tubing 70 of the dialyzer. When the patient's blood fills the dialyzer 14, the venous tubing 74 is connected to the venous canula 76 and the extracorporeal circuit is completed. Heparinization of the blood entering the dialyzer 14 is necessary to prevent clotting the extracorporeous circuit.

The blood volume within the Kiil-type dialyzer is approximately 300 ml. during operation. The attached blood tubing 70, 74 contains about an additional 100–200 ml. Consequently, the dialyzer need not be primed with blood prior to use unless the patient is small or has a depleted blood volume. The blood in the dialyzer and tubing is returned to the patient after dialysis is concluded, by displacing it with 500 ml. saline or with air, according to known techniques. A shunt (not shown) is then interconnected between the canulas 72, 76.

The dialysis solution circuitry is preferably thoroughly washed following each period of use. This may simply be done by directing some of the effluent from ion exchange unit 13 into dialysate concentrate line 80 and using such water to purge or flush the concentrate from lines 80 and 107, mixer 38, bubble trap 40, main conduit 62, the solution passageways in the dialyzer 14, conduit 50, jet pump 120, and drain line 44'.

*Off-on valve.*—The valves 20 in the water line 18 and 78 in the dialysate concentrate line 80 are preferably primarily electrically operated so that they can be opened and closed by merely moving switches at a control panel CP provided in the storage cabinet for the apparatus. However, to improve the reliability of the system, such valves should also include a hand operated, i.e. manual, control handle.

*Filter.*—The water is filtered for the purpose of removing from it any small particles (three micron, absolute) of foreign matter, such as small particles of rust, mineral particles, organic material, etc. A typical type of filter that is suitable for use in this system is the Microfil filter (Models 055240 and 055241) made by the Filter Division of The Bendix Corp., of Madison Heights, Mich. The filtration equipment may also include an ion exchange filter 13 to remove minerals from the water and prevent mineral deposit plugging of the fluid system.

*Pressure regulator.*—An attempt is made by water departments to maintain the water pressure in the distribution system within a desired pressure range. However, there is a fluctuation in pressure within this range which requires the use of a pressure regulator 10 in the system of this invention. The primary function of regulator 10 is to both reduce the pressure down from the distribution system pressure to the lower system pressure, and establish a constant flow rate.

*Proportioner.*—As shown by FIG. 3, the proportioner 24 may comprise a turbine or rotary fluid motor 82 located between large and small rotary positive displacement devices 84, 86. The turbine rotor and the rotors 90, 92 of the positive displacement devices 84, 86 are coupled together so that at least the rotors 90, 92 are rotated at the same angular velocity. Owing to this arrangement, the volume ratio of the water flowing through device 84 to the concentrate flowing through device 86 is always constant regardless of any variations in the rotational rate of the two rotors 90, 92. The positive displacement devices 84 and 86 are shown in FIG. 5 to be Moyno type, manufactured by Robbins and Myers, Inc. of Springfield, Ohio. This type of positive displacement pump is self priming; pumping action starts the instant the rotor turns. Also, the flow is smooth and turbulence-free. Its progressive cavities provide substantially exact metering.

Other suitable proportioners may comprise two pumps of the types shown by FIG. 6 and FIG. 8. The flexible tube pump 84' of FIG. 6 simply comprises a section of flexible tubing 93 through which the flow is "milked" by twin lobe rotor 95. This type of pump is made by the Randolph Pump Co. of Houston, Tex. The positive displacement pump form of FIG. 7 is generally of the eccentric ring type; is known as the Gerotor pump; and is available through the W. H. Nichols Co. of Waltham, Mass. This type of pump is highly reliable, a necessary characteristic in hemodialysis use. The gear pump 84" (FIG. 8) may also be used at both ends of the proportioner, and may also be used as the motor 82.

FIG. 9 shows yet another modified form of proportioner, comprising only a positive displacement motor 82 and a pump 86'. Flow through motor 82 is determined by a pressure regulator 10'. The effluent of motor 82 is delivered into the cold-water passageway means of the unit 28. The excess water is discharged through the secondary line starting with conduit 104.

*Degasing unit.*—Preferably both the cold-water passageways 26 and the heated water passageway means 34 of the heat exchanging apparatus are vertically oriented, and the heating zone 30 is located at the lower ends of such passageways 26, 34. Preferably also, the heated water passageway means 34 is annular and concentrically surrounds the cold-water passageway means 26.

The heater 32 may be of the immersion type, such as the type MTS-3 heater made by the Edwin L. Wiegand Company of Pittsburgh, Pa.

It may be necessary to provide some sort of auxiliary cooling means. Conveniently, such cooling means may take the form of a third passageway means 100 of annular form concentrically surrounding the heated water passageway means 34. Some or all of the water which flows through the turbine 82 can be directed through the passageway means 100 for the purpose of extracting additional heat from the water in passageways 34, if additional cooling is necessary.

A bypass passageway 102 extends from the turbine outlet duct 104 about the passageway means 100 to the drain line 44. It includes a variable orifice valve 105 which is regulated by a mechanism 106 in response to the temperature of the water in conduit 62 measured by a temperature probe 108. If the temperature measured by the probe 108 is in the proper temperature for the water at that point the valve 105 will be open to bypass conduit 102, and at least some of the turbine exhaust water will flow through the bypass conduit 102. An over temperature condition measured by the probe 108 will send a signal to control device 106 causing a partial or complete closing of valve 105, so that some or more of the turbine exhaust water will flow through the conduit means 100.

*Auxiliary heater.*—Owing to a variance in the temperature of the water taken from the distribution system 16, particularly between the warmer and cooler months of the year, it may be desirable to regulate the heating and cooling in the degasing unit 28 so that the water leaves such unit at a temperature below the dialyzer demand temperature, and then utilize an auxiliary heater to bring the temperature up to the desired level. In the system of FIG. 3 an auxiliary electrical heater may be positioned in the conduit 62 substantially immediately downstream of the degasing unit 28, and controlled by a temperature probe located substantially immediately ahead of the dialyzer 14.

*Dialysate concentrate.*—By way of typical and therefore nonlimitive example, the water to concentrate ratio may be about 35:1, and the dialysate composition may be as follows:

|  | mEg./l. |
|---|---|
| Sodium | 135. |
| Chloride | 100.5. |
| Magnesium | 1.0. |
| Calcium | 2.5. |
| Acetate | 38. |
| Potassium | 0–1.5 as needed. |
| Dextrose | 200 mg. percent. |

*Admixing.*—The mechanism for admixing the dialysate concentrate to the stream of temperature conditioned water may simply consist of an annular inlet passageway 114 which concentrically surrounds a nozzle portion 116 of the conduit 62 which delivers the water to the mixer 38, and arranged so that the concentrate enters as an envelope surrounding the central stream of water. Mixing baffles or blades (not shown) may be provided in the divergent section 118 of the mixer 38.

*Exhaust pump.*—As heretofore explained, the pressure in the water taped from the distribution system 16 is used throughout the system of this invention to cause the fluid flow through the various components involved. The energy in the water flowing through drain line 44, which may be substantial, may be used in an aspirator or jet pump 120 for aiding the extraction of the dialysis solution from the dialyzer 14. In FIG. 3 the conduit 44 is shown to feed either into a conduit 122 leading to the jet pump 120 or a bypass conduit 124, depending on the position of a three-way control valve 126.

The primary purpose of the jet pump 120 at its control valve 126 is to provide a controllable, variable negative pressure within the dialysis solution passageways in the dialyzer 14, to in turn control ultrafiltration of the blood in the dialyzer 14. As is known, "ultrafiltration" is the process of normalizing blood volume and pressure by removal of water. If a lower pressure or suction is needed on the outlet side of the dialyzer 14 to aid ultrafiltration, the valve 126 is moved to a position causing the drain line water to flow through the jet pump 120 and lower the pressure at the construction 128. If the drain line water pressure is by itself insufficient, three-way valve 125 is positioned to cause some of the main distribution system water to flow through line 127 into the jet pump 120. Primary flow to the jet pump 120 may be decreased by moving the valve 126 in the direction to cause the waste water to be directed through conduit 124 and around the jet pump 120. A pressure sensing device 179 is located in line 50. It sends a signal to the control panel CP which is directly read at meter 186. The operator reads the pressure at meter 186 and then manually operates valve 126 if a change in pressure is in order.

SAFETY DEVICES AND ALARMS

*Blood leak detection.*—Preferably, a blood leak detector 130 is positioned in the dialysis solution exhaust line 50 near the outlet 48. If blood appears in the exhaust solution, indicating a tear in one of the cellophane membranes of the dialyzer 14, an alarm is turned on to awaken the patient.

*Blood pressure monitor.*—Preferably a drip bulb 123 is provided in either line 70 or line 74. Changes in the air pressure in the drip bulb measured by a pressure transducer are used to monitor the arterial line. The blood drip bulb pressure is also registered on a dial type meter at the control panel CP.

Monitoring of the blood pressure is essential in detecting significant and life-threatening blood loss from an accidental separation of the canulas or hemodialyzer blood circuit. The blood pressure monitor will also detect hypertension occurring because of excessive ultrafiltration and from blood loss through a membrane leak.

*Heparin delivery alarm.*—Heparinization of the blood entering the dialyzer 14 is necessary to prevent clotting in the extra-corporeal circuit. By way of example, heparinization is achieved by delivering about 10–20 mg. heparin per hour with a constant infusion pump into the arterial blood tubing 70. Pump failures may be easily detected by the use of a vibration detecting meter such as the Freqmeter marketed by the Solid State Electronic Corporation of Sepulveda, Calif.

*Power failure alarm.*—The system should also include a battery operated circuit (not shown) for operating dump valve 60 and a patient alarm in the event of a power failure. The alarm should include both a buzzer and a light.

*Dialysis solution concentration.*—The electrical conductivity of the dialysis solution is measured at 56 by equipment which includes means for controlling a three-way valve dump 58. If an improper conductivity is sensed, indicating that the concentration of the solution is not right, the control mechanism will move the three-way valve 58 and divert the flow through conduit 60 to the drain line 44 and will sound a buzzer alarm.

Normally the position of valve 58 is such that the solution flows through the primary conduit 62 and the entrance to the branch conduit 60 is closed.

*Over pressure condition.*—An excess pressure escape conduit 64 extends from the primary conduit 62 to the drain line 44. It includes a pressure relief valve 66. Whenever the pressure at point 68 in conduit 62 is too high, i.e. it exceeds about 150 mm., the valve 66 opens an amount sufficient to relieve the excess pressure.

The safety system should also include a temperature probe 136, a flow meter 138 and a pressure probe 140 immediately ahead of the solution inlet 46 of the dialyzer 14. Each of these monitors 136, 138, 140 include control mechanism for operating dump valve 58 in the event of a detected irregularity.

Figure 4:
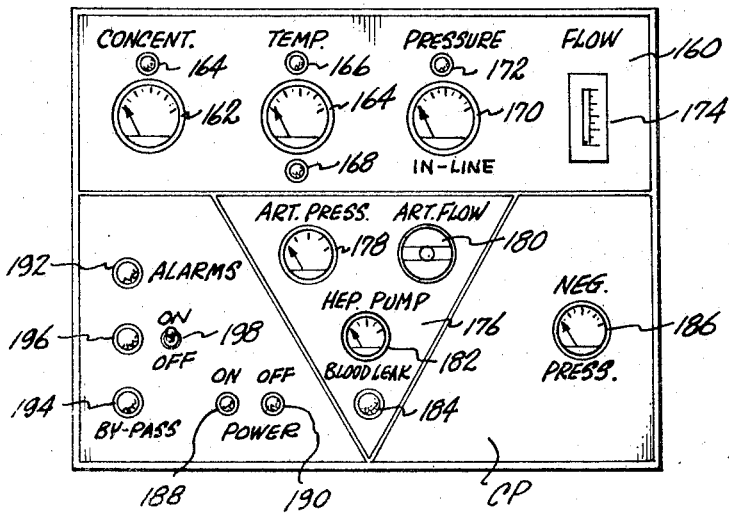
FIG. 4 is a view of a typical control panel layout.

Referring to FIG. 4, by way of typical and therefore nonlimitive example, the meters for the dialysis solution monitors are shown arranged in the upper part 160 of the control panel CP. They include a direct read dial 162 and an alarm light 164 associated with the concentration measuring equipment 56; a direct read dial 164 and alarm lights 166, 168 associated with the temperature control mechanism and monitor; a direct read dial 170 and an alarm light 172 associated with the line pressure monitor; and a direct read flow meter 174. The read-off devices associated with the arterial monitors are shown positioned within a generally central triangular area 176. They are shown to include direct read dials 178, 180, 182 for indicating the arterial pressure, the arterial flow and the heperin flow, respectively. A blood leak warning light 184 is also included in area 176. A negative pressure dial is located in the lower righthand corner of the control panel CP, and indicates the solution pressure in the dialyzer 14. Warning lights may be positioned to the left of the triangular area 176, and may include different colored lights 188, 190 indicating whether the power is on or off; a light 192 indicating when on that the alarm systems are in working order; a light 194 which when on indicates that the dump valve 58 is open; and a light 196 which indicates that the system power has been turned on. It is shown located adjacent an on-off switch 198. The controls for the various manually controlled valve may also be located on this control panel CP.

Each of the various monitors used should be of a type which record their own failure and upon such failure sound an alarm.

Figure 2:
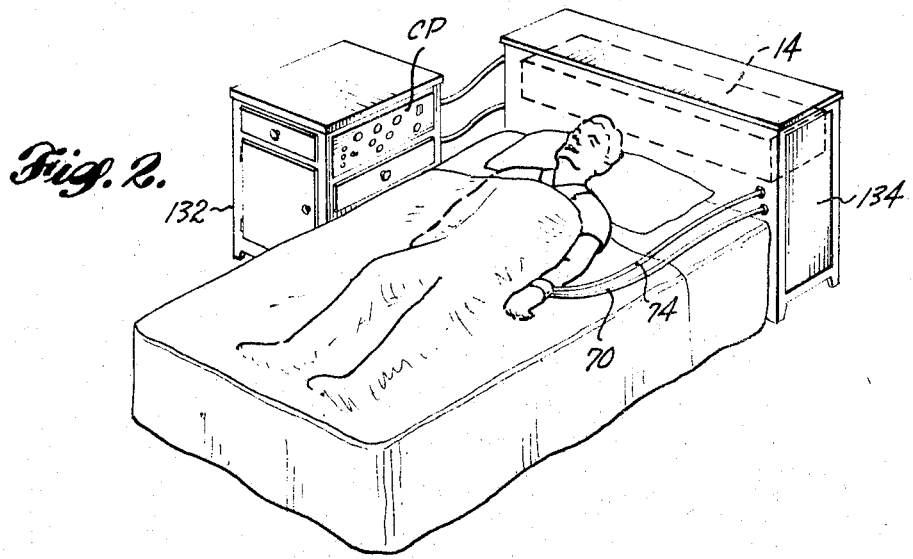
FIG. 2 is a pictorial view of two pieces of bedroom furniture which have been adapted to house the hemodialysis equipment of the present invention.

According to the invention, the various apparatus making up the system shown by FIG. 2, with the exception of the distribution conduit 16 and the dialyzer 14, are housed within a bedside cabinet 132 which in exterior appearance is made to closely resemble a conventional night stand. This is made possible because the system of this invention is a "continuous flow" or "flow through" type system, requiring no large reservoir for the dialysis solution. Also, owing to its shape, the degasing unit 28 is relatively compact and takes up a relatively small amount of space.

Also according to the invention, the dialyzer 14 is housed within a hollow headboard portion 134 of the patient's bed. The headboard portion of the bed is made to in exterior appearance closely resemble a book case type of headboard.

The integration of the dialysis equipment into the bedroom furniture is done for the purpose of concealing it so that it is not readily evident to a person entering the bedroom that a piece of medical equipment necessary to sustain the life of the patient is present in the room. Concealment of such equipment has the effect of boosting the morale of both the patient and the patient's family. Hospital styled equipment is not present to remind the patient or the patient's family of the patient's condition. Also, it is possible for the woman of the house to have and maintain an attractive bedroom setting, similar to if a conventional bed and bedside stand were in fact being used in the room.

What is claimed is:

1. A method of preparing a hemodialysis solution for use in a hemodialyzer comprising:

obtaining water from the local water distribution system at the system pressure;

directing a continuously flowing stream of said system water through a rotary fluid motor;

metering both an additional amount of said system water and a dialysate concentrate by use of a proportioning means driven by said rotary fluid motor;

flowing the metered water through a heating zone;

heating such metered water as it flows through the heating zone up to a degasing temperature substantially above the dialysis temperature;

flowing the heated metered water from the heating zone through a cooling zone;

flowing at least a portion of the effluent water from said rotary fluid motor through the cooling zone, in indirect heat exchange relationship to the heated metered water, for cooling said heated metered water;

continuing to flow the metered water from the cooling zone through conduit means leading to a hemodialysis solution inlet of a hemodialyzer;

delivering the metered dialysate concentrate into said conduit means and admixing it to said flowing metered water to form the hemodialysis solution;

removing gas bubbles from said conduit means;

delivering the hemodialysis solution into the hemodialyzer at the correct dialysis temperature, concentration, pressure and flow; and flowing the effluent of said rotary fluid motor into and through a drain conduit means leading to a disposal station.

2. The method of claim 1, further comprising measuring the conductivity, temperature and pressure of the solution in the conduit means and diverting such solution into said drain conduit means rather than flowing it through the hemodialyzer if it is not proper.

3. The method of claim 1, further comprising directing the removed air and gas bubbles into said drain conduit means.

4. The method of claim 1, further comprising flowing the water in the drain conduit means through a jet pump and using the energy in it to pump used hemodialysis solution from the hemodialyzer.

5. Continuous flow apparatus for preparing a hemodialysis solution and delivering it to a hemodialyzer, comprising:

a source of water under line pressure;

a source of hemodialysate concentrate;

proportioning means operable by water flow, said proportioning means comprising a rotary fluid motor, a water meter, and a hemodialysate concentrate meter;

conduit means for delivering water from said source to both said rotary fluid motor and said water meter;

a flow through type heater;

conduit means for delivering metered water from said water meter to and through said heater;

cooling water conduit means for flowing at least a portion of the fluid motor effluent in indirect heat exchange relationship with the metered water from the flow through heater, to cool said metered water;

delivery conduit means receiving said cooled metered water and ultimately delivering it into the hemodialysis solution flow path of the hemodialyzer;

conduit means for delivering metered hemodialysate concentrate from the hemodialysate concentrate meter into said delivery conduit means, for admixture therein with the flowing metered water to form the hemodialysis solution;

means for removing released gas bubbles from said delivery conduit means; and drain conduit means receiving the effluent of said fluid motor and said cooling water conduit means and directing it as a flowing stream to a disposal means.

6. Apparatus according to claim 5, wherein said water and hemodialysate concentrate meters are rotary positive displacement devices driven together by said fluid motor.

7. Apparatus according to claim 5, wherein the means for removing gas bubbles from said delivery conduit means discharges into said drain conduit means.

8. Apparatus according to claim 5, further comprising means for measuring the conductivity, temperature and pressure of the hemodialysis solution in said delivery conduit means, and means responsive thereto for diverting flow of such solution from said delivery conduit means into the drain conduit means when the solution is not proper.

9. Apparatus according to claim 5, further including a housing for such apparatus in the form of a bedside cabinet resembling in exterior appearance a piece of conventional bedside furniture.

10. Apparatus according to claim 5, wherein the conduit means for delivery metered water to and through the heater and the cooling water conduit means are both generally vertically oriented, the proportioning means is located above them, flow of metered water is first downwardly through its conduit means and then back upwardly to the delivery conduit means, and flow of the fluid motor effluent is vertically downwardly through its conduit means.

11. Apparatus according to claim 5, further including jet pump means in said drain conduit means, operable by the drain water and connected to the hemodialysis solution outlet of the hemodialyzer.

12. Apparatus according to claim 10, including means for heating said metered water in its downward pass.

13. Apparatus according to claim 10, further including a housing for such apparatus in the form of a bedside cabinet resembling in exterior appearance a piece of conventional bedside furniture.

14. Continuous flow apparatus for preparing a hemodialysis solution and delivering it to a hemodialyzer, comprising:

a source of water under line pressure;

a source of hemodialysate concentrate;

proportioning means operable by water flow, said proportioning means comprising a rotary flow through fluid motor and a hemodialysate concentrate meter driven by said motor, so that the amount of concentrate metered is proportional to the amount of water flowing through the motor;

conduit means for delivering water from said source to said rotary fluid motor;

a flow through type heater;

conduit means for delivering the water discharging from said motor to and through said heater;

cooling water conduit means for flowing additional water in indirect heat exchange relationship with the water effluent of the flow through heater, to cool said metered water;

delivery conduit means receiving said cooled water and ultimately delivering it into the hemodialysis solution flow path of the hemodialyzer;

conduit means for delivering metered hemodialysate concentrate from the hemodialysate concentrate meter into said delivery conduit means, for admixture therein with the flowing metered water to form the hemodialysis solution;

means for removing released gas bubbles from said delivery conduit means; and drain conduit means receiving the effluent of said cooling water conduit means and directing it as a flowing stream to a disposal means.

15. Apparatus according to claim 14, further including a housing for such apparatus in the form of a bedside cabinet resembling in exterior appearance a piece of conventional bedside furniture.

16. Hemodialysis equipment comprising:

a bedside cabinet closely resembling in exterior appearance a piece of conventional bedside furniture;

conduit means for delivering a flowing stream of water system water into said bedside cabinet;

apparatus in said cabinet for receiving said flowing water and preparing a dialysis solution, said apparatus comprising flow-through degasing means, temperature control means, means for admixing a dialysate concentrate to said flowing water to form the dialysis solution, and means for removing air and gas bubbles from the flowing fluid;

dialysis solution delivery conduit means leading from said cabinet;

a hollow headboard portion which in external appearance closely resembles the headboard portion of a conventional bed;

a hemodialyzer housed in said hollow headboard portion and including inlet and outlet means for the dialysis solution and inlet and outlet means for blood;

blood delivery conduit means connected at one end to a blood inlet of the dialyzer and adapted at the other end for connection to an arterial canula;

blood return conduit means connected at one end to the blood outlet of the dialyzer and being adapted at its other end for connection to a venous canula;

conduit means leading from the dialysis solution outlet of the dialyzer to a disposal station; and wherein said dialysis solution delivery conduit means leading from said cabinet extending into said hollow headboard portion of the bed to the dialysis solution inlet of the dialyzer.

17. Hemodialysis equipment comprising:

a bedside cabinet closely resembling in exterior appearance a piece of conventional bedside furniture;

conduit means for delivering a flowing stream of relatively cold water system water into said bedside cabinet;

apparatus in said cabinet for receiving said flowing water and preparing a dialysis solution, said apparatus comprising flow-through degasing means, temperature control means, means for admixing a dialysate concentrate to said flowing water to form the dialysis solution, proportioning means for the water and dialysate concentrate powered by water flow, means for removing air and gas bubbles from the flowing fluid, and drain conduit means for the powering water leading from said cabinet; and dialysis solution delivery conduit means leading from said cabinet.

References Cited

UNITED STATES PATENTS

| | | | |
|---|---|---|---|
| 3,352,779 | 11/1967 | Austin et al. | 210—321 X |
| 3,406,826 | 10/1968 | Willock | 210—87 |
| 3,416,664 | 12/1968 | Kumme et al. | 210—321 X |

OTHER REFERENCES

Eschbach et al.: "Unattended Overnight Home Hemodialysis," from Trans. Amer. Soc. for Artificial Internal Organs, vol. XII, 1966, pp. 346–356 relied on, 108 pages, published June 10, 1966.

REUBEN FRIEDMAN, Primary Examiner

F. A. SPEAR, Jr., Assistant Examiner

U.S. Cl. X.R.

210—87, 90, 96, 180, 321